May 29, 1956
R. W. BALTOSSER
2,748,370
SEISMOMETER
Filed June 26, 1951
3 Sheets-Sheet 1
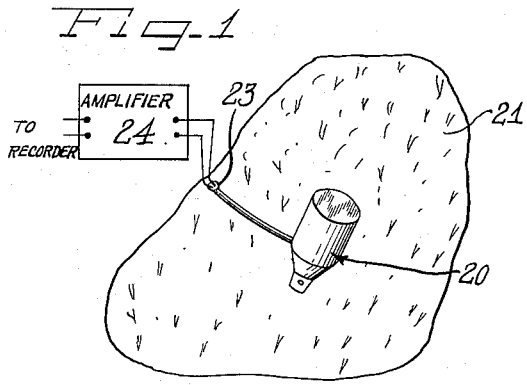
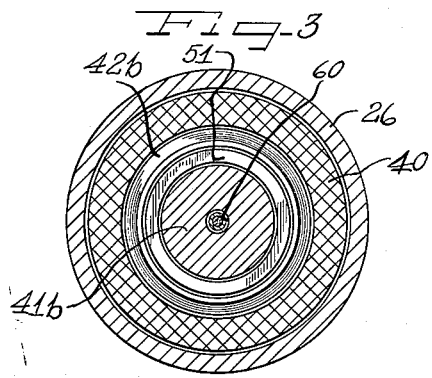
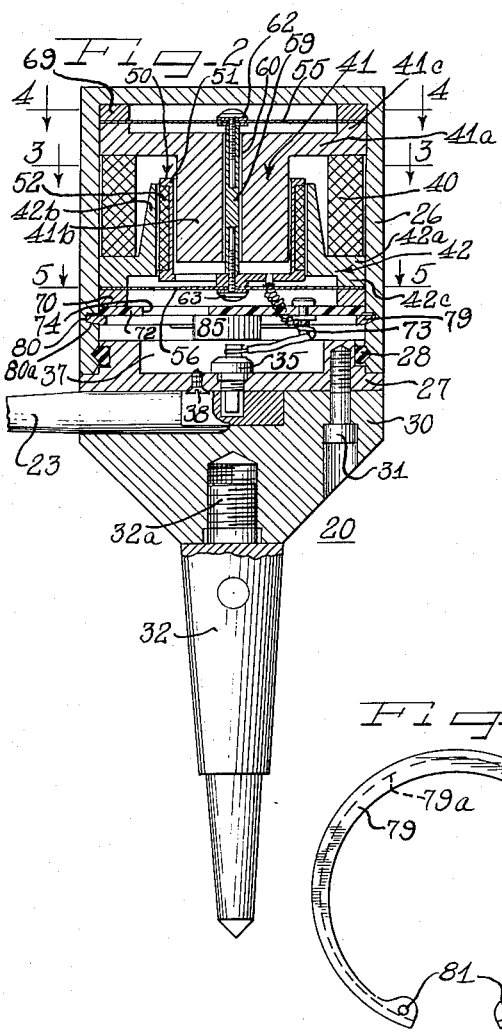
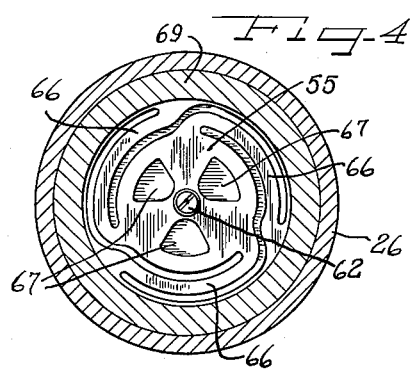
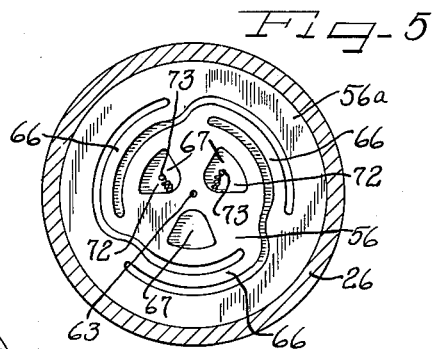
Inventor
Robert W. Baltosser
by Mason, Kolehmainen, Rathburn & Wyss
Attys

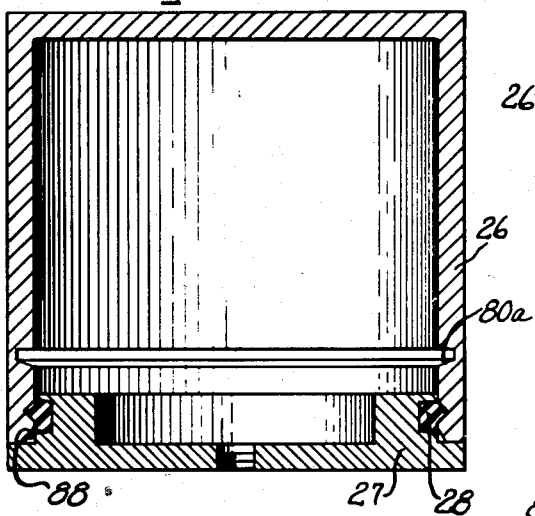
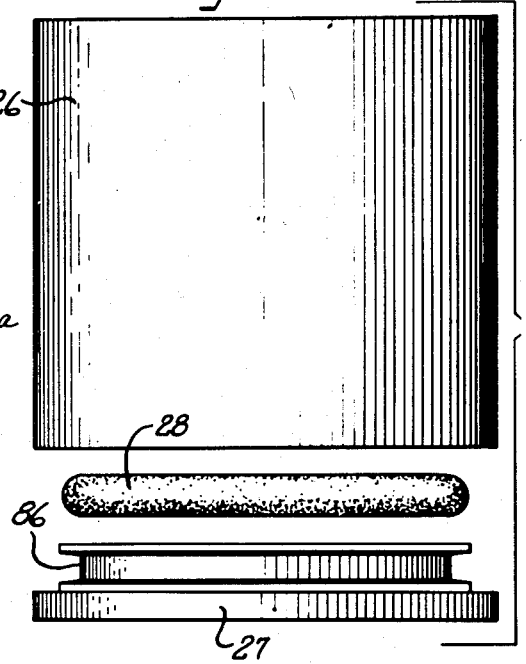
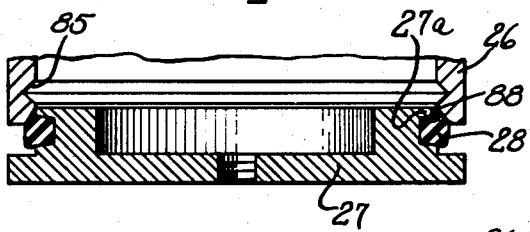
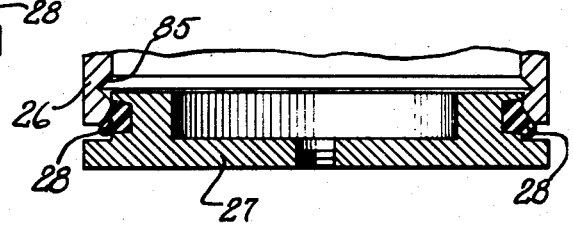
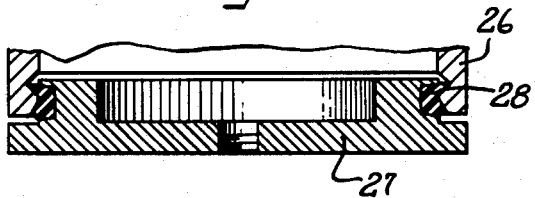

May 29, 1956 R. W. BALTOSSER 2,748,370
SEISMOMETER
Filed June 26, 1951 3 Sheets-Sheet 3
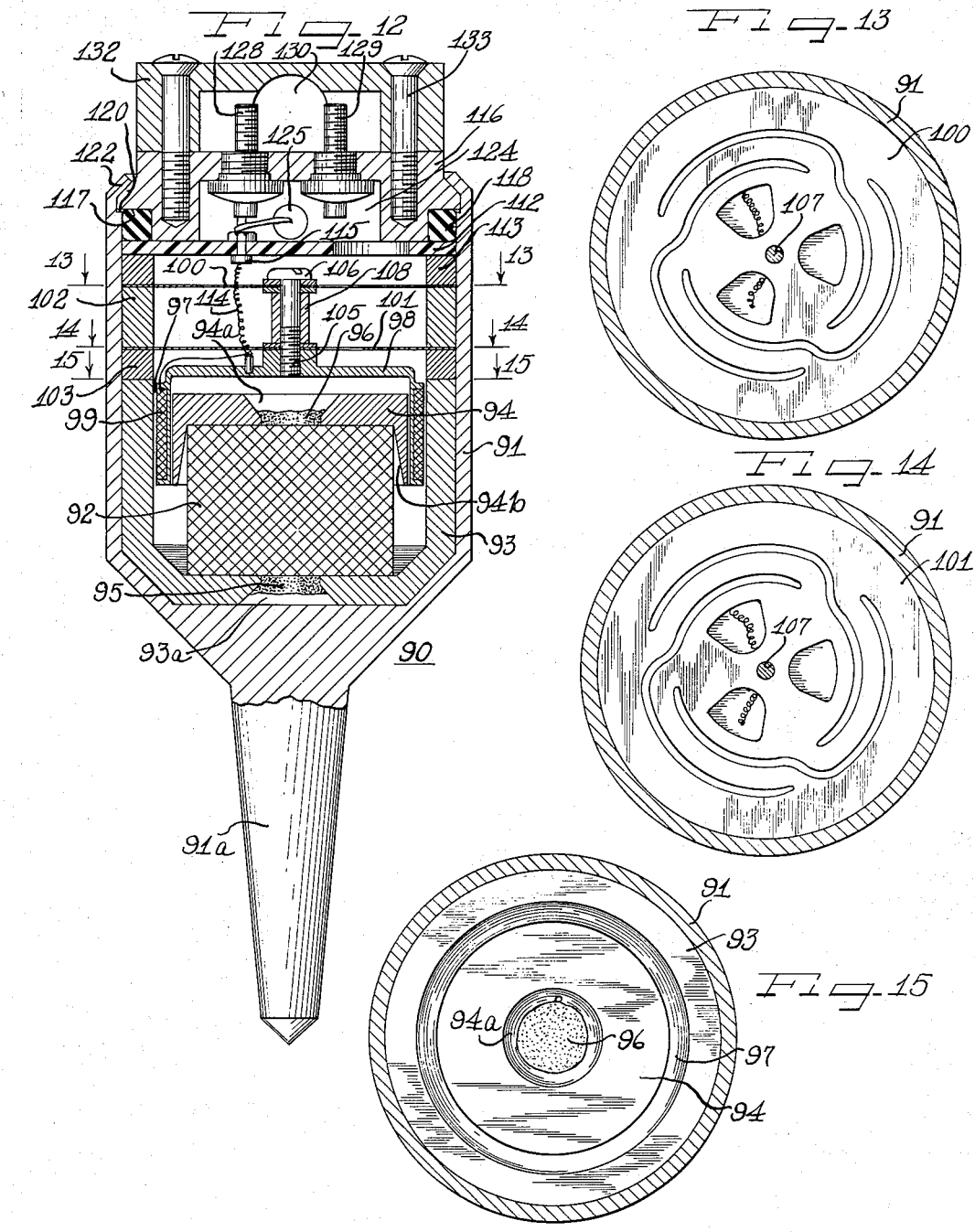
Inventor
Robert W. Baltosser
by Mason, Kolehmainen, Rathburn & Wyss Attys United States Patent Office 2,748,370
Patented May 29, 1956

2,748,370

SEISMOMETER

Robert W. Baltosser, Tulsa, Okla., assignor to Seismograph Service Corporation, Tulsa, Okla., a corporation of Delaware Application June 26, 1951, Serial No. 233,605

15 Claims. (Cl. 340—17)

The present invention relates to seismometers and more particularly to devices for detecting vibrations of any sort, but particularly seismic vibrations.

The recording and analyzing of all mechanical vibrations plays an important part in many industrial fields and the devices for accomplishing this purpose embody numerous principles. In general, these devices can be classified in two classes, namely, mechanical or electrical. The mechanical type of device is usually used for recording natural earthquake waves and comprises a mass suspended on a spring or springs which remain virtually stationary with reference to the frame work of the instrument which frame work rests or is connected in some way to the ground or the vibrating object. The relative displacement of the mass and frame in the mechanical devices is magnified by lever arms and preferably recorded by suitable means such as a stylus or the like.

Electrical devices may comprise several different types such as electrostatic devices in which the space between two condenser plates is varied in order to give an electrical indication in response to vibrations or earth movements causing such movement between condenser plates. Such electrical devices have also comprised those designated as piezo-electric devices in which crystals having piezoelectric properties are stressed by the earth movements or other vibrations thus generating electric currents. Another type of electrical device often termed bolometer device comprises an arrangement in which bellows actuated by vibrations such as seismic waves, for example, force air currents past bolometers thereby varying the bolometer potentials.

Electrical devices for recording vibrations also comprise so called electromagnetic devices which may be divided into two separate groups. One group of electromagnetic devices is provided with means for varying the reluctance of a magnetic circuit in response to earth movements and the resultant variable fluxes are linked with electric coils in which corresponding electric currents or potentials are generated. The other group of electromagnetic devices comprises what is often termed the moving coil type of device in which the position of a coil relative to a magnetic field of substantially constant strength is varied by earth movements causing a cutting of magnetic lines of force by the coil or coils thus generating electric currents or potentials therein. The present invention is particularly concerned with seismometers belonging to this last mentioned group of the electromagnetic type. Prior to the present invention such seismometers have been rather massive devices, expensive to manufacture and of complicated construction. It would be desirable to provide a seismometer but a fraction of the size of prior art seismometers which is simple and compact in construction, fool-proof in operation and which will give years of satisfactory service.

Accordingly, it is an object of the present invention to provide an improved seismometer having the desirable features enumerated above.

Such seismometers must be provided with a suitable housing sealed against gas and liquid and arrangements employed heretofore have been very complicated with respect to the sealing means and the like. Accordingly, it is another object of the present invention to provide an improved seismometer which is sealed against gas and liquid and which is readily adapted for high speed assembly and manufacture.

It is another object of the present invention to provide improved assembly means for a seismometer in which all components are self-aligned to insure proper positioning thereof.

It is another object of the present invention to provide an improved spring suspension structure for the support of the moving coil.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 1 is a perspective view showing an application of a seismometer of the present invention;

Fig. 2 is an enlarged vertical sectional view through the seismometer of Fig. 1;

Fig. 3 is a sectional view taken on line 3—3 of Fig. 2, assuming that Fig. 2 shows the complete structure;

Fig. 4 is a sectional view taken on line 4—4 of Fig. 2, assuming that Fig. 2 shows the complete structure;

Fig. 5 is a sectional view taken on line 5—5 of Fig. 2, again assuming that Fig. 2 shows the complete structure;

Fig. 6 is a plan view of one of the elements of the seismometer of Fig. 2;

Fig. 7 is a vertical sectional view through the sealed casing employed with the seismometer of the present invention to show the general application of the sealing means employed;

Fig. 8 is an exploded view of the casing elements shown in Fig. 7;

Figs. 9, 10 and 11 are sectional views similar to Fig. 7 of successive steps in the sealing operation of the components shown in Fig. 8 while moved from the position shown in Fig. 8 to the position shown in Fig. 7;

Fig. 12 is a sectional view similar to Fig. 2 illustrating a modification of the present invention;

Fig. 13 is a sectional view taken on line 13—13 of Fig. 12;

Fig. 14 is a sectional view taken on line 14—14 of Fig. 12; and

Fig. 15 is a sectional view taken on line 15—15 of Fig. 12 with the moving coil removed.

It should be understood that the seismometer of the present invention, although particularly well adapted for detecting seismic waves, can, of course, be used to detect vibrations or movements in any type of material with which they are in contact. Such other applications of the device of the present invention will readily be understood by those skilled in the art and it is not intended that the present invention be limited solely to seismometers for detecting seismic waves, but the general principles of the present invention have broader application. It will be understood that in the art of seismic surveying, artificial earthquakes or earth vibrations are generated by means of an explosive or other means and the reuslting seismic waves after refraction and/or reflection from subsurface formations are detected by seismometers. Since the present invention is concerned with an electromagnetic type of seismometer, these vibrations are converted to electric currents corresponding to the seismic waves impinging on the device and these electric currents after suitable amplification are transmitted to oscillographic elements, for recording on a suitable record strip. Conventionally, a large number of such seismometers are employed to record at different locations the respective seismic waves due to the detonation of an explosive.

As illustrated in Fig. 1 of the drawings, the seismometer generally designated at 20 is shown as being disposed in contact with the earth generally designated at 21 so as to be subjected to seismic waves transmitted through the earth. The output of the seismometer 20 which is an electrical one is supplied through suitable conductors or a cable 23 to an amplifier 24 for suitably amplifying the electric currents and then to a recording device which may include further amplification not shown in the drawings.

Referring now particularly to Figs. 2 to 6 of the drawings, the seismometer 20 comprises a main casing portion 26 designated as a cup-shaped member preferably formed of aluminum or the like, and in a seismometer successfully built in accordance with the present invention, this cup-shaped casing member 26 was formed of aluminum and had an outside diameter of slightly over two inches and a height or depth of about the same dimension, thus indicating the relatively small size of the seismometer of the present invention. This casing is shown in considerably more detail in Figures 7 and 8 of the drawings where the cover or lid 27 of the casing is also shown together with the means for sealingly relating the cover or lid 27 with the casing 26. This feature of the invention, which is disclosed and claimed in copending divisional application Serial No. 233,606, filed June 26, 1951, will be described in greater detail hereinafter and includes a suitable sealing ring 28 disposed within cooperating recesses of the cover 27 in casing 26 to not only maintain the cover and casing in assembled relationship, but to provide a high pressure seal which will withstand a minimum of 1200 pounds per square inch of external pressure and which requires a minimum of 100 pounds per square inch of internal pressure to separate the cover 27 from the casing 26 when once joined in the manner shown in Figs. 2 and 7 of the drawings.

It will be understood that the seismometer must receive vibrations which are to be converted to electric impulses or electrical energy and means are, therefore, provided for the particular application mentioned to relate the seismometer 20 with the earth 21. As illustrated, a tapered cap 30 is attached by suitable screws such as 31 with the lid or cover 27. Moreover, attached to the tapered cup 30 is a suitable spike 32 which is inserted in the earth such as 21 as indicated in Fig. 1 of the drawings. This spike may be provided with a threaded extension 32a received within a suitably threaded recess in the tapered cap 30. The tapered cap 30 is furthermore provided with a passageway for the cable or lead 23 and suitable means generally designated at 35 are provided to permit the electrical conductors from the lead 23 to extend into a chamber 37 defined within the casing 26 through the lid or cover 27. Preferably, the cover or lid 27 is also provided with a suitable opening closed by a sealing screw 38 whereby a gas or fluid under pressure may be supplied to the chamber 37 to separate the lid 27 from the casing 26, should this be desirable for any reason.

In view of the fact that the seismometer of the present invention is of the moving coil electromagnetic type in which the moving coil cuts constant lines of forces, there is disposed within the chamber 37 a magnetic assembly comprising an annular permanent magnet 40, a pole piece 41 and a pole ring 42 assembled to define between portions of the pole piece and pole ring a uniform annular air gap having substantially uniform lines of flux passing therethrough. Specifically, the magnet 40 is an annular magnet formed of magnetic material of the type now available on the market and designated commonly by the term "Alnico No. 5." The pole piece 41 comprises an enlarged portion 41a having an external diameter substantially equal to the internal diameter of the casing 26. This portion 41a has an extension on one side of greatly reduced diameter designated as 41b which is disposed concentrically with the annular magnet 40. On the other side of the portion 41a of the pole piece 41 is an annular raised portion 41c which acts as a spacer. Preferably the pole piece 41 is made of ferro-magnetic material having a low reluctance.

The pole ring 42 like the pole piece 41 includes a portion 42a of large diameter substantially equal to the internal diameter of the casing 26. Projecting from the annular portion 42a is an annular portion 42b disposed concentrically with the projection 41b of the pole piece 41 and having a straight wall on the annular surface adjacent the portion 41b to define a uniform air gap of substantial length between the portions 41b and 42b. The opposite surface of the annular portion 42b is of conical configuration so as to tend to insure uniform flux distribution along the air gap between the portions 41b and 42b. The pole ring 42 furthermore includes an annular raised portion 42c substantially identical with the portion 41c of the pole piece 41 to act as a spacer member. The magnetic assembly comprising elements 40, 41 and 42 are related in the positions clearly shown in Fig. 2 of the drawings and in view of the diameter of the portions 41a and 42a will tend to be held in the proper position by the casing 26 which insures that these parts are held in proper concentric relationship. It will be understood that with the above described construction a constant and uniform flux will be disposed across the annular air gap defined between portions 41b and 42b which in effect is a radial field.

For the purpose of supporting an electrical winding or coil within the air gap defined between the portions 41b and 42b to cut the constant lines of flux across the air gap in response to movement of the coil to be described hereinafter within this air gap, there is provided a suitable coil assembly generally designated at 50 comprising a somewhat cup-shaped spool of brass or other non-magnetic material designated at 51 with its open end disposed to receive the projection 41b of the pole piece 41. Wound around the outer surface of the cup-shaped spool 51 is an electrical winding or coil. The lower end of the cup-shaped spool 51 is provided with center supporting means including a central opening. The coil is preferably supported from suitable flat disk suspension springs designated as 55 and 56 which have their outer edges respectively disposed on the annular spacer portions 41c and 42c of the pole piece 41 and pole ring 42, respectively. A suitable spring strut 59 extends between the two center portions of the flat disk suspension springs 55 and 56 through a central opening 60 defined in the pole piece 41. A suitable screw 62 connects the upper end of the strut 59 with the center of the flat disk suspension spring 55 while a similar screw 63 connects the lower end of the strut 59 with the center of the flat disk suspension spring 56 and simultaneously clamps the spool 51 and consequently the coil 52 to the strut 59 so as to provide a spring supported movable coil arrangement.

The suspension springs 55 and 56 are preferably identical and are formed of suitable material such as Phosphor bronze or the like and are initially in the form of relatively thin disks. In order to provide the desired spring construction, portions of the disk are etched away to provide a plurality of spring arms 66 in each of the disks 55 and 56 which spring arms interconnect an outer annular portion 55a or 56a of the springs 55 and 56 respectively with a central portion. Preferably also, a plurality of openings such as 67 are also defined by etching away portions of the spring members 55 and 56 through which the leads or conductors from the coil 52 may extend. By using such an etching process, there is eliminated any stress of the spring members which might be caused by stamping operations and furthermore a complicated die is dispensed with. In accordance with the present invention, the spring arms 66 in both the upper and lower disks, which in effect are curved spokes, extend in the same direction around the disk center in both the upper and lower disks. This is clear from a comparison of Figs. 4 and 5 of the drawings. This is essential since when the springs flex, there is a slight rotation of the coil 52 and if the spokes 56 were not in the same direction, opposed effects would be obtained to limit relative movement between the coil 52 and the field structure comprising the elements 40, 41 and 42 and produce signal distortion. This is an important feature of the suspension means. With this arrangement, a cantilever action is obtained due to the freedom of vertical movement resulting from rotational freedom. Moreover, rotation of the coil 52 in the radial magnetic field induces no voltage and hence causes no undesirable effects. The curved spokes 66 have a constant strength cantilever cross section area where they join the supporting rings 55a and 56a of springs 55 and 56, respectively, as well as where they join the respective central sections of these springs. The coil 52 will remain accurately concentric with the air gap since by virtue of the symmetrically disposed curved spokes 66 equal shortening and lengthening of these spokes relative to the axis along which relative movement between the magnet assembly and coil occurs, will result with such relative movement only along such axis, thus insuring an accurate conversion of the vibrations causing such relative movement to electrical signals.

In accordance with the present invention, the assembly described thus far comprising the field structure and coil and suspension springs is inserted into the open end of the casing 26, a suitable spacer ring 69 preferably being first inserted into the bottom of the casing. The spacer ring 69 may be of non-magnetic material such as aluminum or the like. Then the entire assembly is inserted with the suspension spring 55 adjacent the pole piece 41 being inserted first. In view of the relative diameters of the portions of the magnet assembly and the inside diameter of the casing 26, all the parts are held in proper position. A suitable spacer ring 70 similar to the spacer ring 69 is then inserted to engage the annular portion 56a of the spring 56.

For the purpose of providing suitable terminal supports, there is preferably disposed within the casing 26 a terminal plate 72 formed of suitable insulating material such as Bakelite or the like and having attached thereto a plurality of terminals such as 73. These terminals are adapted to be connected by flexible leads with the terminals of the coil 52. The insulating terminal plate 72 preferably also comprises a plurality of openings such as 74 defined therein through which the leads from the coil may extend to engage the terminal 73.

In order to retain the parts of the seismometer described above within the casing 26 in proper assembled relationship, there is provided a retaining ring 79 best shown in Fig. 6 of the drawings and formed of suitable spring material which tends to expand to an enlarged diameter and which is adapted to be disposed in an annular recess 80 defined adjacent the open end of the casing 26. This annular recess has an angularly disposed wall 80a which cooperates with a similar surface 79a on the expansion ring 79 so that as the ring is expanded into the groove 80, it will tend to press the parts into tightly assembled relationship within the casing 26. The expansion ring 79 is discontinuous at one point as indicated in Fig. 6, and preferably comprises a pair of openings such as 81 adjacent the discontinuation for the purpose of receiving a tool to compress the ring when initially inserted into the casing 26.

From the above description, it will be apparent that there has been described a very compact mechanism which may be assembled in a simple manner and by virtue of the magnet 40 formed of Alnico No. 5 a very high flux is produced across the air gap so that movement of the coil or winding 52 will cause a substantial current to be induced in the winding 52, the magnitude of the current depending upon the number of lines of flux which are cut. The direction in which the coil moves in cutting these lines will, of course, also make a difference.

If desired, a suitable damping resistor 85 may be supported on the terminal plate 72. It will furthermore be appreciated that electrical connections from the terminal 73 may be made to the conductors passing through the cover 27 of the casing 26.

Considering now in detail the arrangement by which the cover 27 may be fastened to the casing 26 to provide a suitable pressure seal therebetween, attention is directed to Figs. 7 to 11 of the drawings. It should be understood that this sealing arrangement may be employed in many other applications and its application to the seismometer 20 is by way of example only. As illustrated, the casing 26 is provided adjacent its open end with a V-shaped groove 85 defined on the inner surface thereof. Moreover, the cover 27 is provided with an annular portion 27a adapted to extend into the casing 26 in the assembled relation thereof. Defined in this annular portion 27a on the surface thereof which is adjacent the inside wall of the casing 26 is an annular groove 86 which may be of substantially any configuration adapted to receive therein the sealing ring 28. Preferably the sealing ring 28 may be any standard sealing ring of the type which is commonly referred to in the trade as an "O-ring," probably because it is of toroidal form with a circular cross section. For the particular casing size, a sealing ring formed of suitable compressible material such as rubber or the like may have an outside diameter of the order of about two inches and an inside diameter of the order of 1¾ inches which means that the sealing ring has a cross section of the order of ⅛ inch in diameter. The dimension of the groove 86 is such that the sealing ring 28 can almost, but not quite, be fully enclosed therein when sufficient compressible force is applied thereto. Further in accordance with the present invention, the inside edge at the open end of the casing 26 is chamfered as indicated at 88. In making the seal between the cover 27 and the casing 26, the sealing ring 28 is inserted in the groove 86 and the cover with the sealing ring disposed therein is then moved to the position shown in Fig. 9 of the drawings where the edges of the sealing ring engage the chamfer 88. When pressure is applied to the cover 27 to force the cover into position relative to the casing 26, the chamfer tends to compress the sealing ring 28 within the groove 86 as indicated in Fig. 10 of the drawings. Continued pressure on the cover 27 causes the V-shaped groove 85 to begin to coincide with the groove 86 whereupon the sealing washer 28 will tend to expand into the V-shaped groove as shown in Fig. 11 and the chamfered portion 88 will tend to force all other portions of the sealing ring 28 into the groove 86 as clearly shown in Fig. 11 of the drawings. When the cover is moved to the completely closed position shown in Fig. 7 of the drawings, the sealing ring 28 is wholly contained within the groove 86 and the V-shaped groove 85. With this simple arrangement, the cover is completely sealed to the container 26 and a very satisfactory fluid seal is provided against gases and liquid pressures. As a matter of fact, it has been found that this seal will withstand a pressure of 1200 pounds per square inch applied to the external surfaces of the cover 26 and 27 without leakage into the container. Moreover, a pressure of 100 pounds per square inch within the container is necessary to separate the lid or cover 27 from the casing 26 and this means is resorted to should it ever be necessary to disassemble the seismometer described above. The cover may be provided with a suitable opening such as is indicated in Fig. 2 of the drawings closed by the screw 38 through which suitable pressure may be applied to the interior of the casing for this purpose.

From the above detailed description, it is believed that the operation of the seismometer of the present invention will readily be apparent to those skilled in the art. When the seismometer is in contact with a vibrating surface or, for example, in contact with the surface of the earth as indicated in Fig. 1 of the drawings, the vibrations or seismic waves are transmitted to the casing 26 and hence to the magnetic assembly which vibrates in response to the vibrations transmitted thereto. The spool 51 and coil 52, however, due to the inertia thereof, tend to remain stationary and the relative movement of the coil within the annular air gap across which a constant flux is produced by virtue of the magnet 40, produces a current in the coil 52 which is supplied through cable 23 to suitable amplifying and recording means forming no part of the present invention. The seismometer of the present invention is substantially smaller than prior art seismometers and is of very simple construction. Moreover, it is unusually easy to assemble the same since the parts are merely inserted in the casing which causes all of them to assume their correct positions and by means of the retaining ring, all of the parts are held in proper assembled relationship with only the requirement of the fastening screws 62 and 63 being properly inserted. By virtue of the improved flat disk suspension springs 55 and 56, a distortion free signal is obtained of high magnitude. Moreover, with the simple sealing arrangement between the cover 27 and the casing 26, the whole unit may be sealed in a simple and inexpensive manner to provide a positive and foolproof arrangement.

The seismometer described above can also be used in an inverted position with the flat portion of the casing 26 in contact with the ground. Under these conditions, it is necessary to be sure that proper polarity with respect to the leads extending to the amplifier 24 is maintained.

Referring now to Figs. 12, 13, 14 and 15 of the drawings, there is illustrated a modification of the present invention by means of which an even smaller seismometer than that already described may be employed. As illustrated, the seismometer generally designated by the reference numeral 90 comprises a casing 91 which is of cup-shaped construction and which has integrally formed therewith a spike 91a. The casing is preferably formed of non-magnetic material such as aluminum or the like and in one embodiment of the present invention has an inside diameter of less than 1.4 inches. Disposed within the casing 91 is a magnet assembly comprising a magnet 92, pole ring 93 and pole piece 94. The magnet 92 is indicated as a cylindrical mass preferably formed of the same material described above for the magnet 40. The pole ring 93 is of somewhat cup-shaped configuration snugly to fit within the housing 91 adjacent the bottom thereof as shown in Fig. 12 of the drawings. It is provided with an opening 93a to receive excess solder indicated at 95 for soldering the magnet 92 and pole ring 93 together. The pole piece 94 rests on top of the magnet 92 and is of inverted cup-shaped configuration with a central opening 94a to receive excess solder 96 for uniting the pole piece 94 and magnet 92. The inside wall 94b of the pole piece 94 is of tapered or inclined configuration so as to provide uniform flux distribution in the air gap between the outer annular surface of the pole piece 94 and the inner annular surface of the pole ring 93 which air gap is designated by the reference numeral 97. The magnet 92 produces a high uniform and constant flux distribution throughout the air gap 97. It will be understood that the magnet 92 has the pole ring 93 and pole piece 94 soldered thereto as clearly indicated in Fig. 12 of the drawings with all parts concentric to provide an accurate annular air gap 97.

In order to produce an electrical signal in response to movement of the magnet assembly comprising elements 92, 93 and 94, there is disposed within the air gap 97 a coil spool 98 preferably formed of brass or other non-metallic material upon which is mounted a coil 99. This spool 98 is similar to the spool 51 except that it is inverted with respect to the spool 51 disclosed in Fig. 2 of the drawings by virtue of the different arrangement of the magnet assembly.

The spool 98 is preferably supported from a pair of flat disk suspension springs 100 and 101 which are held in spaced relationship by a suitable spacer member 102. The spool 98 is provided with a threaded opening in the upper central portion thereof designated by the reference numeral 105 for receiving a suitable fastening means 106 which extends through central openings 107 in each of the flat disk suspension springs 100 and 101. A suitable spacer 108 maintains a uniform spacing between the center portions of the suspension springs 100 and 101. It will be apparent that the suspension of the coil spool 98 differs somewhat from that shown in Fig. 2 of the drawings, since the springs are both disposed above the spool whereas in Fig. 2 the spool is disposed between the two suspension springs.

In order to support the assembly comprising the suspension springs 100 and 101 and the spool 98 upon which the coil 99 is wound within the annular air gap 97, the lowermost suspension spring 101 has its annular edge resting upon a spacer member 103 which in turn is supported on the upper edge of the cup-shaped pole ring 93. Preferably the spacer member 103 is formed of a non-magnetic material such as aluminum. Thus, the suspension springs are effectively supported on the pole ring 93. Since the outer diameter of the pole ring 93 and the outer diameters of the suspension springs 100 and 101 and the spacer members 102 and 103 are substantially equal to the inner diameter of the casing 91, these elements are all sort of "self jigged" during assembly so as to be suitably supported within the casing 91 in accurately assembled relationship. As is obvious from Figs. 13 and 14, the suspension springs 100 and 101 are of the same configuration as the springs 55 and 56 although of smaller diameter and each comprises the curved spokes which extend in the same direction for the upper and lower springs as was discussed above.

As in the preceding embodiment, the seismometer 90 also includes an insulating terminal plate 112 which is disposed within the housing 91 and supported on a spacer plate 113 resting on the outer portion of flat disk spring 100. As in the preceding embodiment, electrical conductors such as 114 connect the terminals of the coil 99 with suitable terminals 115 disposed on the insulating terminal plate 112.

For the purpose of closing the casing 91 of the seismometer 90, the same sealing arrangement indicated in Figs. 7 to 11 of the drawings may be employed. As illustrated in Fig. 12, however, a cover plate 116 is provided having a diameter so as to be insertable within the casing 91. Preferably also, the cover 116 is provided with an annular recess or notched out portion 117 for receiving a suitable sealing washer 118. As illustrated, the casing 91 is counterbored adjacent its open end or otherwise constructed to define a ledge 120 for supporting the cover member 116. The lid or cover member 116 may be threadedly engaged with the casing 91, but preferably and as indicated in Fig. 12 of the drawings, the casing member 91 is deformed as indicated at 122 firmly to unite the lid 116 with the casing 91. It will be apparent that this can be accomplished by a simple crimping or rolling operation of an extruded lip of the casing 91 down around the cover thereby compressing the sealing ring 118 into sealing engagement between the casing 91 and the lid or cover 116.

As indicated in Fig. 12 of the drawings, the lid 116 is provided with means defining a recess 124 therein to provide a space for a suitable damping resistor 125 corresponding with the damping resistor 85 of Fig. 2 of the drawings. A pair of terminals 128 and 129 extending through the cover or lid 116 provide electrical connections through the cover and it will be understood that the portions of these terminals disposed within the recess 124 are electrically connected to the terminals on the insulating terminal plate 112 thus in effect providing electrical connections to the coil 99 and including in circuit the damping resistor 125.

A suitable cable similar to the cable 23 of Figs. 1 and 2 of the drawings is preferably associated with the seismometer 90 and may be disposed in the space 130 between the portions of the terminals 129 extending outside the cover 116. To protect this cable an outer closure member 132 is provided fastened to the lid 116 by fastening means 133.

The operation of the seismometer disclosed in Figs. 12 to 15 of the drawings is substantially identical with that of the seismometer already described and will be readily apparent to those skilled in the art. It will, furthermore, be apparent that there has been provided a simple and compact device which can be manufactured at low cost and yet which will provide accurate conversion of seismic waves or other vibrations to distortion free electric signals.

While there have been described and illustrated several embodiments of the present invention, it should be understood that the present invention is not limited to the specific details of construction and arrangement thereof herein illustrated and that changes and modifications will occur to those skilled in the art without departing from the present invention. It is aimed in the appended claims to cover all such changes and modifications as fall within the true spirit and scope of the present invention.

What is claimed as new and desired to be secured by Letters Patent of the United States is:

1. In apparatus for use in seismic geophysical exploration comprising a cup-shaped casing, a magnet assembly comprising a permanent magnet, a pole piece and a pole ring assembled to define an annular air gap between said pole piece and said pole ring having a substantially uniform radial flux distribution thereacross, means including an annular coil disposed in said air gap, means comprising a pair of flat disk suspension springs, means for supporting said springs within said casing, means for connecting the central portions of said springs together and to said means including said annular coil thereby to support said coil within said air gap for relative movement with respect to said magnet assembly, at least one element of said magnet assembly, said means for supporting said springs, and said springs, all having a diameter closely conforming to the internal diameter of said casing and being arranged in a stack in predetermined superimposed relationship in said casing, and means engageable with said casing for applying pressure to one end of said stack and comprising the sole means for holding said stack in assembled relationship, and in accurately related positions whereby said annular coil is concentrically disposed in said air gap regardless of the relative positions of said coil and magnet assembly as determined by said flat disk suspension springs.

2. In apparatus for use in seismic geophysical exploration comprising a cup-shaped casing, a magnet assembly comprising a permanent magnet a pole piece and a pole ring assembled to define an annular air gap having a substantially uniform radial flux distribution thereacross, means including an annular coil disposed in said air gap, means comprising a pair of flat disk suspension springs, means for supporting said springs at their outer edges within said casing in fixed relationship relative to said magnet assembly, means for connecting the central portions of said springs together and to said means including said annular coil thereby to support said coil within said air gap for relative movement with respect to said magnet assembly, at least one element of said magnet assembly, said means for supporting said springs, and said springs, all having a diameter closely conforming to the internal diameter of said casing and being arranged in a stack in predetermined superimposed relationship in said casing, and means engageable with said casing for applying pressure to one end of said stack and comprising the sole means for holding said stack in assembled relationship, and in accurately related positions whereby said annular coil is concentrically disposed in said air gap.

3. A vibration responsive device comprising a cup-shaped casing, a magnet assembly comprising a permanent magnet a pole piece and a pole ring assembled to define an annular air gap having a substantially uniform radial flux distribution thereacross disposed within said casing, means including an annular coil disposed in said air gap, means comprising a pair of spaced suspension springs, means for supporting said springs within said casing, means for connecting the central portions of said springs together and to said means including said annular coil thereby to support said coil within said air gap for relative movement with respect to said magnet assembly, at least one element of said magnet assembly, said means for supporting said springs, and said springs, all having a diameter closely conforming to the internal diameter of said casing and being arranged in a stack in predetermined superimposed relationship in said casing, and means engageable with said casing for applying pressure to one end of said stack and comprising the sole means for holding said stack in assembled relationship, and in accurately related positions whereby said annular coil is concentrically disposed in said air gap.

4. In a seismometer comprising a cylindrical casing closed at one end, closure means for the open end of said casing including a spike for insertion into the earth to transmit vibrations from the earth to said casing, a magnet assembly comprising a permanent magnet a pole piece and a pole ring assembled to define an annular air gap having a substantially uniform radial flux distribution thereacross, said magnet assembly being insertable into said casing and having a diameter so as to be maintained in a predetermined positional relationship by said casing, means including an annular coil disposed in said air gap, means comprising a pair of flat disk suspension springs, means for supporting said springs within said casing on the respective ends of said magnet assembly, means defining a central opening through said magnet assembly, means for connecting the central portions of said springs together and to said means including said annular coil thereby to support said coil within said air gap for relative movement with respect to said magnet assembly, at least one element of said magnet assembly, said means for supporting said springs, and said springs, all having the same diameter and being arranged in a stack in predetermined superimposed relationship in said casing, and means cooperating with said casing for applying pressure to one end of said stack and comprising the sole means for holding said stack in assembled relationship.

5. In a seismometer comprising a cylindrical casing having an open end and a closed end terminating in a spike insertable into the earth to transmit vibrations of the earth to said casing, a magnet assembly comprising a permanent magnet a pole piece and a pole ring assembled to define an annular air gap having a substantially uniform radial flux distribution thereacross, at least one of the elements of said magnet assembly conforming accurately to the shape of the interior of said casing, means including an annular coil disposed in said air gap, means comprising a pair of flat disk suspension springs, means for effectively supporting said springs within said casing from said one element, means for connecting the central portions of said springs together and to said means including said annular coil thereby to support said coil for movement within said air gap, said springs and said means for supporting said springs also conforming accurately to the shape of the interior of said casing whereby at least one of said elements, said springs, and said means for supporting said springs are arranged in predetermined superimposed relationship in a stack in said casing and means engaging said casing adjacent one end thereof for applying pressure to said stack and comprising the sole means for maintaining the parts of said seismometer in accurately related positions whereby said annular coil is concentrically disposed in said air gap.

6. In apparatus for use in seismic geophysical exploration comprising a cup-shaped casing, a magnet assembly comprising a permanent magnet a pole piece and a pole ring assembled to define an annular air gap having a substantially uniform radial flux distribution thereacross, means including an annular coil disposed in said air gap, means comprising a pair of flat disk suspension springs, means for supporting said springs within said casing, means for connecting the central portions of said springs together and to said means including said annular coil thereby to support said coil within said air gap for relative movement with respect to said magnet assembly, said casing having such a diameter as to maintain said magnet assembly and disk suspension springs in accurately related positions whereby said annular coil is concentrically disposed in said air gap regardless of the relative positions of said coil and magnet assembly as determined by said flat disk suspension springs, and means comprising an element cooperating with said casing and constituting the sole means for applying pressure to said magnet assembly, said pair of flat disk suspension springs and said means for supporting said springs which are arranged in a predetermined superimposed stacked relationship for fixedly securing said magnet assembly and suspension springs to said casing.

7. In apparatus for use in seismic geophysical exploration comprising a cup-shaped casing, a magnet assembly comprising a permanent magnet a pole piece and a pole ring assembled to define an annular air gap having a substantially uniform radial flux distribution thereacross, means including an annular coil disposed in said air gap, means comprising a pair of flat disk suspension springs, means for supporting said springs at their outer edges within said casing in fixed relationship relative to said magnet assembly, said means for supporting said springs, as well as said springs, and at least one element of said magnet assembly, all having a shape conforming accurately to the shape of the interior of said casing and arranged in superimposed stacked relationship in said casing, means for connecting the central portions of said springs together and to said means including said annular coil thereby to support said coil within said air gap for relative movement with respect to said magnet assembly, a cover for said casing, cooperating means on said cover and said casing, and sealing means effected by said last mentioned means for holding said cover to said casing in sealed relationship with respect thereto and for maintaining said stacked relationship.

8. In apparatus for use in seismic geophysical exploration comprising a cup-shaped casing, a magnet assembly comprising a permanent magnet a pole piece and a pole ring assembled to define an annular air gap having a substantially uniform radial flux distribution thereacross, means including an annular coil disposed in said air gap, means comprising a pair of flat disk suspension springs, means for supporting said springs at their outer edges within said casing in fixed relationship relative to said magnet assembly, said means for supporting said springs, as well as said springs, and at least one element of said magnet assembly, all having a shape conforming accurately to the shape of the interior of said casing and arranged in superimposed stacked relationship in said casing, means for connecting the central portions of said springs together and to said means including said annular coil thereby to support said coil within said air gap for relative movement with respect to said magnet assembly, said casing having such a diameter as to maintain said magnet assembly and disk suspension springs in accurately related positions whereby said annular coil is concentrically disposed in said air gap, closure means for said casing, means for holding said closure means in sealed relationship with respect to said casing, and means for maintaining said stacked relationship, including means cooperating with said casing.

9. A vibration responsive device comprising a cup-shaped casing, a magnet assembly comprising a permanent magnet a pole piece and a pole ring assembled to define an annular air gap having a substantially uniform radial flux distribution thereacross disposed within said casing, means including an annular coil disposed in said air gap, means comprising a pair of spaced suspension springs, means for supporting said springs within said casing, means for connecting the central portions of said springs together and to said means including said annular coil thereby to support said coil within said air gap for relative movement with respect to said magnet assembly, said casing having such a diameter as to maintain said magnet assembly and suspension springs in accurately related positions whereby said annular coil is concentrically disposed in said air gap, means for transmitting vibrations to said casing, a terminal plate having a diameter closely conforming to the internal diameter of the casing, means cooperating with said casing for applying pressure to said terminal plate and said magnet assembly to hold the same in stacked and assembled relationship within said casing, and means comprising electrical connections from said coil to terminals on said terminal plate to provide at said terminals an electrical signal representative of the vibrations transmitted by said last mentioned means to said casing.

10. In a seismometer comprising a cylindrical casing closed at one end, closure means for the open end of said casing including a spike for insertion into the earth to transmit vibrations from the earth to said casing, a magnet assembly comprising a permanent magnet a pole piece and a pole ring assembled to define an annular air gap having a substantially uniform radial flux distribution thereacross, means defining an opening extending along the axis of said magnet assembly, said magnet assembly being insertable into said casing, means including an annular coil disposed in said air gap, means comprising a pair of flat disk suspension springs, means for supporting said springs within said casing on the respective ends of said magnet assembly, a strut extending through said opening connecting the central portions of said springs together, means for connecting said strut to said means including said annular coil thereby to support said coil within said air gap for relative movement with respect to said magnet assembly, at least one element of said magnet assembly, said means for supporting said springs, and said springs, all having a diameter closely conforming to the internal diameter of said casing and being arranged in a stack in predetermined superimposed relationship in said casing, and means engageable with said casing for applying pressure to one end of said stack and comprising the sole means for holding said stack in assembled relationship within said casing whereby vibrations of said casing produce relative movement of said coil and magnet assembly with the consequent production of an electrical signal representative of said vibrations.

11. In a seismometer comprising a cylindrical casing closed at one end, closure means for the open end of said casing, a spike fastened to said casing for insertion into the earth to transmit vibrations from the earth to said casing, a magnet assembly comprising a permanent magnet a pole piece and a pole ring assembled to define an annular air gap having a substantially uniform radial flux distribution thereacross, said magnet assembly being insertable into said casing and having a diameter so as to be maintained in a predetermined positional relationship by said casing, means including an annular coil disposed in said air gap, means comprising a pair of flat disk suspension springs, means for supporting said springs within said casing in fixed relationship relative to said magnet assembly, means for connecting the central portions of said springs together and to said means including said annular coil thereby to support said coil within said air gap for relative movement with respect to said magnet assembly, each of said disk suspension springs comprising a plurality of spaced curved spokes extending in the same direction for each spring to maintain said annular coil accurately concentric with said annular air gap regardless of the relative positions of said coil and air gap.

12. In a seismometer comprising a cylindrical casing having an open end and a closed end including means defining a spike insertable into the earth to transmit vibrations of the earth to said casing, a magnet assembly comprising a permanent magnet a pole piece and a pole ring assembled to define an annular air gap having a substantially uniform radial flux distribution thereacross, the external configuration of at least one of the elements of said magnet assembly conforming to the shape of the interior of said casing, means including an annular coil disposed in said air gap, means comprising a pair of flat disk suspension springs, means for effectively supporting said springs within said casing from said one element, means for connecting the central portions of said springs together and to said means including said annular coil thereby to support said coil for movement within said air gap, said springs and said means for effectively supporting said springs within said casing, having an external configuration identical with that of said one of said elements of said magnet assembly, and arranged with said one of said elements in a predetermined superimposed relationship to define a stack of elements all conforming to the shape of the interior of said casing whereby, when inserted in said casing, the parts are maintained in accurately spaced assembled relationship whereby said annular coil is concentrically disposed in said air gap, and means for applying a pressure to said stack to fixedly maintain said stack in a predetermined assembled relationship.

13. In a seismometer comprising a cylindrical casing having an open end and a closed end terminating in a spike insertable into the earth to transmit vibrating of the earth to said casing, a magnet assembly comprising a permanent magnet, a pole piece and a pole ring assembled to define an annular air gap having a substantially uniform radial flux distribution thereacross, at least one of the elements of said magnet assembly conforming accurately to the shape of the interior of said casing, means including an annular coil disposed in said air gap, means comprising a pair of flat disk suspension springs disposed within said casing, means for effectively supporting said springs at the outer edges thereof from said one element, a plurality of uniformly spaced curved spokes relating the outer edges of each of said springs with the central portions thereof, means for connecting the central portions of said springs together so the curved spokes of each spring extend in the same direction, and means for connecting said last mentioned means to said means including said annular coil thereby to support said coil for movement within said air gap, said casing having such a diameter as to maintain said magnet assembly and disk suspension springs in accurately related positions whereby said annular coil is concentrically disposed in said air gap.

14. A vibration responsive device comprising a cylindrical casing closed at one end, closure means for the open end of said casing, means for transmitting vibrations to said casing, a magnet assembly comprising a permanent magnet, a pole piece and a pole ring assembled to define an annular air gap having a substantially uniform radial flux distribution thereacross, said magnet assembly being insertable into said casing and having a diameter so as to be maintained in predetermined positional relationship by said casing, means including an annular coil disposed in said air gap, means comprising a pair of flat disk suspension springs, means for supporting said springs at their outer edges within said casing in fixed relationship relative to said magnet assembly, means for connecting the central portions of said springs together and to said means including said annular coil thereby to support said coil within said air gap for relative movement with respect to said magnet assembly, each of said disk suspension springs comprising a plurality of spaced curved spokes extending in the same direction for each spring to maintain said annular coil accurately concentric with said annular air gap regardless of the relative position of said coil and air gap.

15. A vibration responsive device comprising a cylindrical casing having a closed end, closure means for the open end of said casing, means for transmitting vibrations to said casing, a magnet assembly comprising a permanent magnet, a pole piece and a pole ring assembled to define an annular air gap having a substantially uniform radial flux distribution thereacross, at least one of the elements of said magnet assembly conforming accurately to the shape of the interior of said casing, means including an annular coil disposed in said air gap, means comprising a pair of flat disk suspension springs disposed within said casing, means for effectively supporting said springs at the outer edges thereof from said one element, a plurality of uniformly spaced curved spokes relating the outer edges of each of said springs with the central portions thereof, means for connecting a central portion of said springs together so that the curved spokes of each spring extend in the same direction, and means for connecting said last mentioned means to said means including said annular coil thereby to support said coil for movement within said air gap, said casing having such a diameter as to maintain said magnet assembly and disk suspension springs in accurately related positions whereby said annular coil is concentrically disposed in said air gap.

References Cited in the file of this patent

UNITED STATES PATENTS

| Number | Name | Date |
|---|---|---|
| 1,974,422 | Hayes | Sept. 25, 1934 |
| 1,980,993 | Hayes | Nov. 20, 1934 |
| 2,348,225 | Petty | May 9, 1944 |
| 2,477,172 | Brownlow | July 26, 1949 |
| 2,487,029 | Piety | Nov. 1, 1949 |
| 2,490,595 | Merton | Dec. 6, 1949 |
| 2,533,249 | Henson | Dec. 12, 1950 |
| 2,557,080 | Dawson | June 19, 1951 |
| 2,675,533 | Brown | Apr. 13, 1954 |